US009641912B1

(12) United States Patent
Morisetti

(10) Patent No.: US 9,641,912 B1
(45) Date of Patent: May 2, 2017

(54) INTELLIGENT PLAYBACK RESUME

(71) Applicant: NXP B.V.

(72) Inventor: Chandrasekhar Morisetti, Bangalore (IN)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/016,547

(22) Filed: Feb. 5, 2016

(51) Int. Cl.
H04N 9/80 (2006.01)
H04N 21/845 (2011.01)
H04N 21/433 (2011.01)
H04N 21/439 (2011.01)
H04N 5/783 (2006.01)

(52) U.S. Cl.
CPC ..... *H04N 21/8455* (2013.01); *H04N 21/4333* (2013.01); *H04N 21/4394* (2013.01)

(58) Field of Classification Search
USPC ................ 386/343, 344, 349, 239, 240, 248
See application file for complete search history.

(56) References Cited

U.S. PATENT DOCUMENTS 5,890,116 A * 3/1999 Itoh ...................... G10H 1/0008
704/260
6,263,308 B1 * 7/2001 Heckerman ........... G10L 15/063
704/231
8,292,433 B2 10/2012 Vertegaal

FOREIGN PATENT DOCUMENTS

WO 2007045178 A1 4/2007

OTHER PUBLICATIONS

International Search Report for International Application No. PCT/IB2013/002218 dated May 27, 2014.

* cited by examiner

*Primary Examiner* — Daquan Zhao
(74) *Attorney, Agent, or Firm* — Rajeev Madnawat

(57) ABSTRACT

A method for resuming playback of a media content is disclosed. The method includes receiving a playback resume command, initiating a counter to an initial value, moving a playback pointer back a first preset duration in the media content, checking for silence at the playback pointer, incrementing the counter by the first preset duration and comparing the counter with a second preset duration. If the counter is greater than the second preset duration, resuming the playback of the media content from the playback pointer.

20 Claims, 3 Drawing Sheets

INTELLIGENT PLAYBACK RESUME

BACKGROUND

Computers and mobile devices are frequently used for playing audio/video contents. With the pervasive use of mobile devices and computers, these days audio/video contents are distributed to users mostly in the form of audio/video files that are played on computers or mobile devices by users. Often, while listening to these audio/video contents, users must attend to other tasks after pausing the playback and resume after they are finished performing those tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for resuming playback of a media content is disclosed. The method includes (a) receiving a playback resume command, (b) initiating a counter to an initial value, (c) moving a playback pointer back a first preset duration in the media content, (d) checking for silence at the playback pointer, (e) incrementing the counter by the first preset duration, and (f) comparing the counter with a second preset duration, wherein if the counter is greater than the second preset duration, resuming the playback of the media content from the playback pointer. If a pause operation is performed at a silence location in the media content and if the duration of the silent location is greater than the second preset duration, the playback of the media content is resumed from the location where the pause operation was performed. If at (f) the counter is less than the second preset duration, performing (c) to (f) again In some embodiments, the first and second preset durations are provided by a user. In other embodiments, the first and second preset durations are calculated through scanning of the media content.

In another embodiment, a computer readable media including programming instructions which when performed by a processor perform an operation of resuming playback of a media content is disclosed. The operation includes (a) receiving a playback resume command, (b) initiating a counter to an initial value, (c) moving a playback pointer back a first preset duration in the media content, (d) checking for silence at the playback pointer, (e) incrementing the counter by the first preset duration and (f) comparing the counter with a second preset duration, wherein if the counter is greater than the second preset duration, resuming the playback of the media content from the playback pointer. If at (f) the counter is less than the second preset duration, performing (c) to (f) again. If a pause operation is performed at a silence location in the media content and if the duration of the silent location is greater than the second preset duration, the playback of the media content is resumed from the location where the pause operation was performed.

In yet another embodiment, a device is disclosed. The device includes a processor and a memory. The memory includes a media playback application, the media playback application is configured to perform an operation. The operation includes (a) receiving a playback resume command, (b) initiating a counter to an initial value, (c) moving a playback pointer back a first preset duration in the media content, (d) checking for silence at the playback pointer, (e) incrementing the counter by the first preset duration and (f) comparing the counter with a second preset duration, wherein if the counter is greater than the second preset duration, resuming the playback of the media content from the playback pointer. If at (f) the counter is less than the second preset duration, performing (c) to (f) again. If a pause operation is performed at a silence location in the media content and if the duration of the silent location is greater than the second preset duration, the playback of the media content is resumed from the location where the pause operation was performed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

FIG. 1 is a symbolic representation of audio waveform with periods of silences in between;

DETAILED DESCRIPTION

Figure 1:
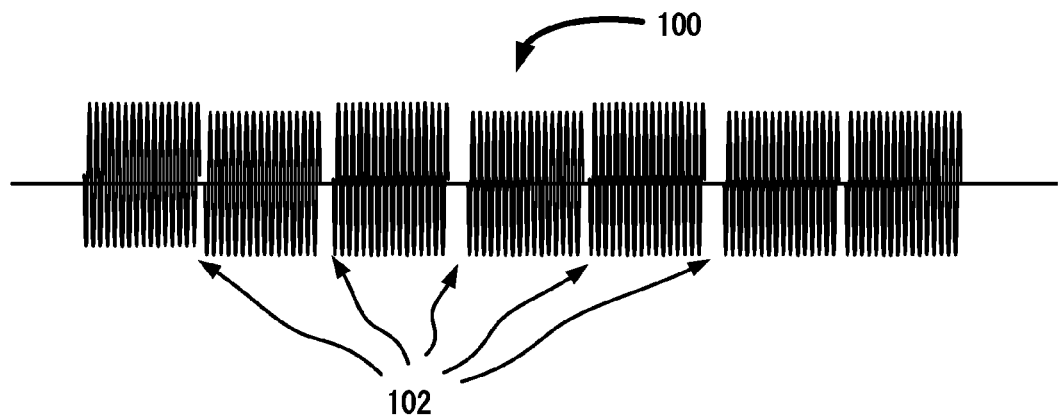

FIG. 1 illustrates a symbolic representation of an audio wave 100. In one embodiment, the audio wave 100 may be an electrical sound wave representation of a group of sentences spoken by an speaker in an audio or video content. Silences 102 within the audio wave 100 represent natural pauses between spoken sentences or words. Typically, a longer silence interval may represent ending of a sentence and beginning of a new sentence. It should be noted that a real life representation of the audio wave 100 may include variations in amplitude corresponding to the variations in loudness of the speaker's voice.

In some embodiments, the distributor of the audio wave 100 may provide a metadata containing time scale locations of silences 102 and their durations. However, in some embodiments described herein, an application may also scan the audio wave 100 to collect a similar metadata and store the metadata persistently associated with the media file of the audio wave 100. In other embodiments, the locations and durations of the silences 102 may be determined during a playback of the audio wave 100.

Figure 2:
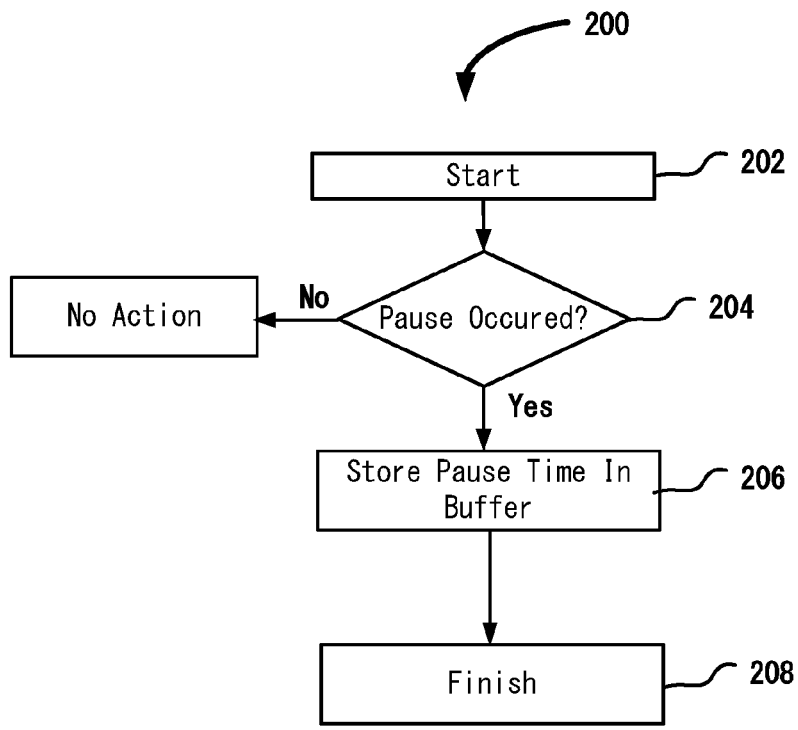
FIG. 2 illustrates a flow chart of capturing a pause in accordance to one of more embodiments of the present disclosure.

FIG. 2 is a method 200 for capturing pause location when the audio wave 100 is paused by a user during a playback. Accordingly, at step 202 the user start a playback of the media file that causes the audio wave 100 to be formed sequentially as the media file is played. At decision step 204, if a pause is detected, at step 206, the location of the pause is stored in a memory buffer. If no pause is detected, the scanning for a pause continues. At step 208, the scanning for a pause is terminated and the process then waits for the detection of a playback resume operation. In one embodiment, the memory buffer is configured to store only one pause location. Therefore, during a playback of the media file if a second pause is detected, previously stored value in the memory buffer is replaced by the new value of the pause location. In another embodiment, the memory buffer may be configured to store more than one pause location to enable the user to jump back to a selected previous pause locations.

Figure 3:
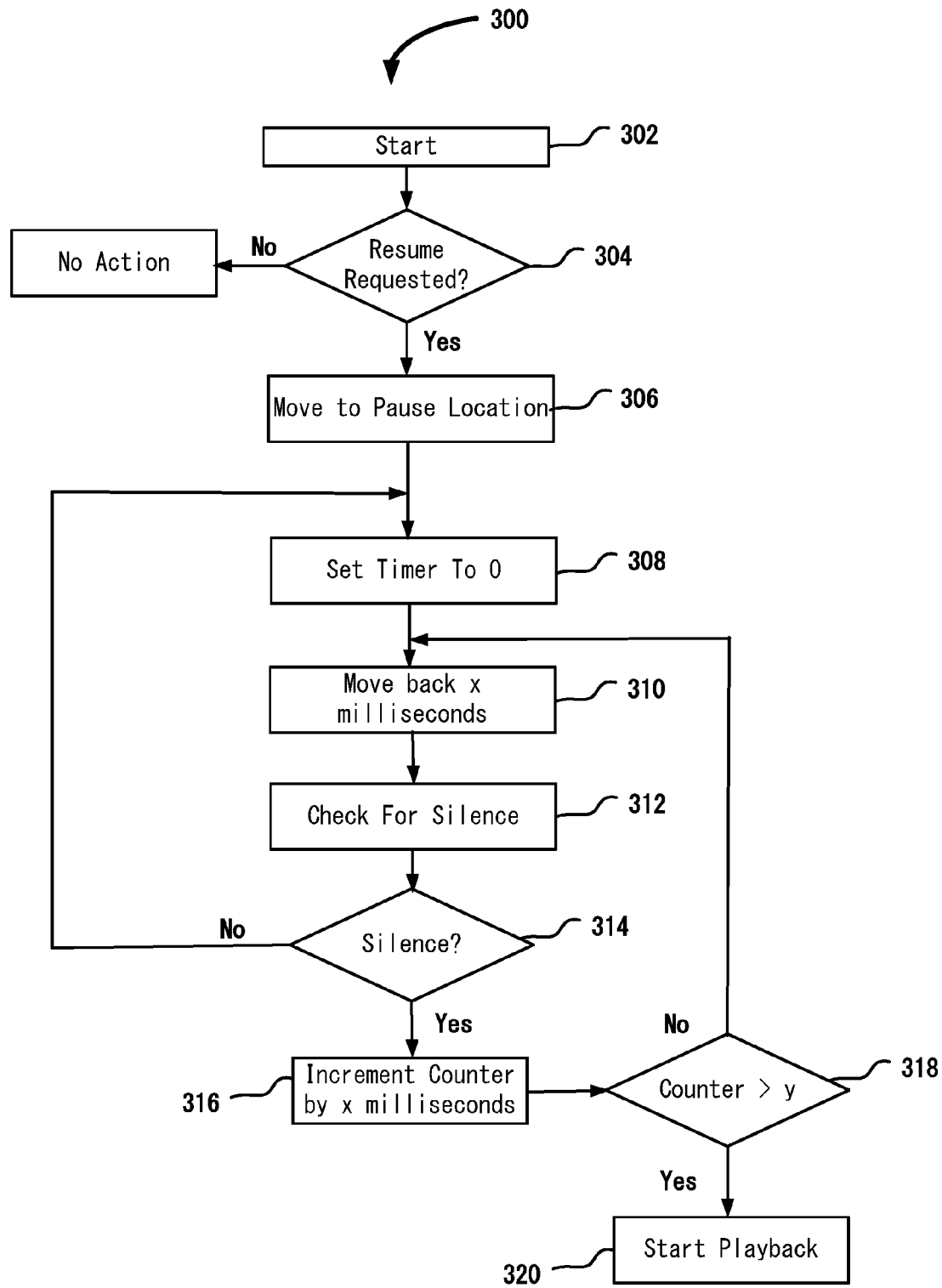
FIG. 3 illustrates a flowchart for resuming a playback in accordance to one of more embodiments of the present disclosure.

FIG. 3 illustrates a method 300 for resume playback from the beginning of a sentence or any other silence location according to a user preference. In one embodiment, as a part of user preferences, a user provides durations of silence between sentences, paragraph changes or pauses in between sentences that generally occur when for example a comma separates two parts of a sentence. The user preference may include settings such as "when resume is selected, go back to the beginning of the sentence" or "go back to the beginning of the paragraph" or "go back to the beginning of sentence sub-part after, for example, the comma", etc. In other embodiments, the silence durations may be provided as a default in a playback application that embodies the embodiments described herein. In some embodiments, if the pause happens to be in between a sentence or between two paragraphs, the playback may resume from the same location without going back to a previously encountered pause location.

The playback of a media file starts at step 302 and continues until paused by the user. At decision step 304, if resume request is detected, at step 306, the pause location is read from the memory buffer. If no data is found in the buffer, the control remains at the current location in the media file. If no resume operation is detected, no action is taken and the playback remains paused. At step 308, a memory timer is invoked and is set to 0 or an initial value (for the purpose of this explanation, 0 will be used as the initial value). At step 310, the playback pointer is moved back x milliseconds, where x is configurable. A default value may be provided by the playback application developer or the user may select a value for x as a part of user preference. Typically, the value of x may be approximately between 5 milliseconds to 50 milliseconds. In some embodiments, the media content may be scanned for silence locations and an average or silence durations between a preset range (e.g., 700 milliseconds to 1200 milliseconds) may be calculated and then divided by a factor (e.g., 5 to 10) to derive the value of x. It may be noted that these range may be adjusted for different media content files.

At step 312, it is checked if the new location contains silence. In some embodiment, the silence may be detected if either there is no signal amplitude in that location or if the signal amplitude is below a preset threshold (which could be indicative of some background noise). At decision step 314, if silence is not detected, the control goes back to step 308. If silence is detected, at step 316, the counter is incremented by x milliseconds. At decision step 318, the counter value is compared with a preset value y. The application developer may provide a default value for y. Alternatively, the user may set a value of y as a part of user preferences. Alternatively, the media content may be scanned for silence locations and an average or silence durations between a preset range (e.g., 700 milliseconds to 1200 milliseconds) may be calculated to derive a value of y. In some embodiments, the value of y may be approximately 1000 milliseconds. This value may be adjusted according to a typical duration of silences in between sentences or paragraphs or sub-sentences in a media file being played. If the counter is greater than the value of y, then at step 320 the media file playback starts from to the location of the playback pointer. If the counter is not greater than the value of y, the control goes back to step 310 and the process is repeated according to the flow chart of FIG. 3. It may be noted that if the initial value of the counter is other than 0, the value of the counter prior to making the comparison with the value of y may be derived by calculating a difference between the final value and the initial value of the counter.

In some embodiments, it may be desirable to resume playback from the paused location if paused location happens to be within a silence 102. Therefore, when steps 314 to 318 are executed for the first time after receiving a resume playback instruction from the user, the value of y is reduced to a lower value because the pause may be somewhere in between a silence location 102 and running a counter to a full value of y is likely to take the playback pointer beyond the silence location 102 in which the playback pointer rests. Hence, in the first execution, if the playback pointer is found to be in a silence location 102, the value of y may be reduced to a lower value in the multiple of x. For example, the value of y may be set to 2-5 times the value of x. However, this lowered value of y may also be configurable and a default value may be provided by the application developer or by the user through user preferences.

Figure 4:
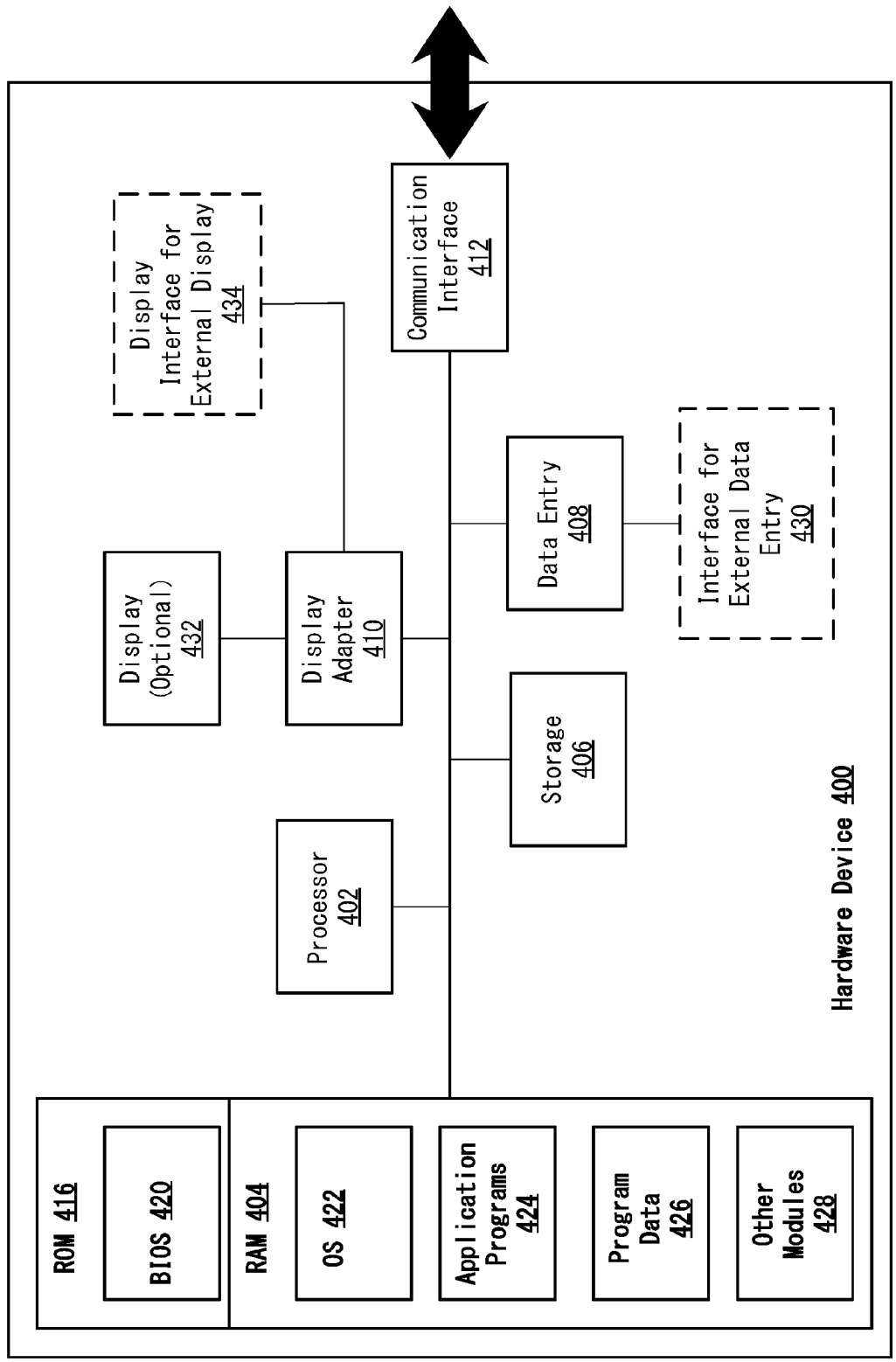
FIG. 4 illustrates a hardware device that embodies implementations of flowcharts of FIGS. 2 and 3 in accordance with an embodiment of the present disclosure.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 308.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. The implementations of the flow charts 200, 300 may be application programs 424. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible, as for example, hardware device 400 may be a mobile device such as a mobile phone or mobile computing device. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function).

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for resuming playback of a media content, comprising:
   (a) receiving a playback resume command;
   (b) initiating a counter to an initial value;
   (c) moving a playback pointer back a first preset duration in the media content;
   (d) checking for silence at the playback pointer;
   (e) incrementing the counter by the first preset duration; and
   (f) comparing the counter with a second preset duration, wherein if the counter is greater than the second preset duration, resuming the playback of the media content from the playback pointer.

2. The method of claim 1, wherein if a pause operation is performed at a silence location in the media content and if the duration of the silent location is greater than the second preset duration, the playback of the media content is resumed from the location where the pause operation was performed.

3. The method of claim 1, wherein the first preset duration is provided by a user.

4. The method of claim 1, wherein the second present duration is provided by a user.

5. The method of claim 1, further including calculating the first preset duration through scanning of the media content.

6. The method of claim 1, further including calculating the second present duration through scanning of the media content.

7. The method of claim 1, wherein if at (f) the counter is less than the second preset duration, performing (c) to (f) again.

8. A non-transitory computer readable media storing programming instructions which when performed by a processor perform an operation of resuming playback of a media content, the operation comprising:
   (a) receiving a playback resume command;
   (b) initiating a counter to an initial value;
   (c) moving a playback pointer back a first preset duration in the media content;
   (d) checking for silence at the playback pointer;
   (e) incrementing the counter by the first preset duration; and
   (f) comparing the counter with a second preset duration, wherein if the counter is greater than the second preset duration, resuming the playback of the media content from the playback pointer.

9. The non-transitory computer readable media of claim 8, wherein if a pause operation is performed at a silence location in the media content and if the duration of the silent location is greater than the second preset duration, the playback of the media content is resumed from the location where the pause operation was performed.

10. The non-transitory computer readable media of claim 8, wherein the first preset duration is provided by a user.

11. The non-transitory computer readable media of claim 8, wherein the second present duration is provided by a user.

12. The non-transitory computer readable media of claim 8, the operation further including calculating the first preset duration through scanning of the media content.

13. The non-transitory computer readable media of claim 8, the operation further including calculating the second present duration through scanning of the media content.

14. The non-transitory computer readable media of claim 8, wherein if at (f) the counter is less than the second preset duration, performing (c) to (f) again.

15. A device, comprising:
a processor;
a memory, wherein the memory includes a media playback application, the media playback application is configured to perform an operation, the operation including:
(a) receiving a playback resume command;
(b) initiating a counter to an initial value;
(c) moving a playback pointer back a first preset duration in the media content;
(d) checking for silence at the playback pointer;
(e) incrementing the counter by the first preset duration; and
(f) comparing the counter with a second preset duration, wherein if the counter is greater than the second preset duration, resuming the playback of the media content from the playback pointer.

16. The device of claim 15, wherein if a pause operation is performed at a silence location in the media content and if the duration of the silent location is greater than the second preset duration, the playback of the media content is resumed from the location where the pause operation was performed.

17. The device of claim 15, wherein the first preset duration is provided by a user.

18. The device of claim 15, wherein the second present duration is provided by a user.

19. The device of claim 15, the operation further including calculating the second present duration through scanning of the media content.

20. The device of claim 15, wherein if at (f) the counter is less than the second preset duration, performing (c) to (f) again.

* * * * *